(12) United States Patent
Nguyen et al.

(10) Patent No.: US 10,152,743 B1
(45) Date of Patent: Dec. 11, 2018

(54) TECHNIQUES FOR PROVIDING SHARED-ORDER FUNCTIONALITY FOR A COMMUNITY OF USERS

(71) Applicant: Amazon Technologies, Inc., Seattle, WA (US)

(72) Inventors: Luan Khai Nguyen, Auburn, WA (US); William Alexander Strand, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 469 days.

(21) Appl. No.: 14/867,224

(22) Filed: Sep. 28, 2015

(51) Int. Cl.
G06Q 30/00 (2012.01)
G06Q 30/06 (2012.01)
G06Q 10/08 (2012.01)

(52) U.S. Cl.
CPC ....... *G06Q 30/0635* (2013.01); *G06Q 10/083* (2013.01)

(58) Field of Classification Search
CPC .......................................... G06Q 30/06–30/08
USPC ............................................... 705/26.1–27.2
See application file for complete search history.

(56) References Cited

U.S. PATENT DOCUMENTS

| 5,426,282 A * | 6/1995 | Humble ................. A47F 9/047 186/61 |
| 2006/0173749 A1* | 8/2006 | Ward ..................... G06Q 10/08 705/26.8 |
| 2013/0238464 A1* | 9/2013 | Bank ...................... G06O 30/06 705/26.41 |
| 2014/0111615 A1* | 4/2014 | McGuire ............... G01L 311/24 348/46 |
| 2014/0188637 A1* | 7/2014 | Balasubramaniam ...................... G06Q 50/12 705/15 |

* cited by examiner

*Primary Examiner* — Ethan D Civan
(74) *Attorney, Agent, or Firm* — Kilpatrick Townsend & Stockton LLP

(57) ABSTRACT

Techniques are provided herein for utilizing a community pantry engine. The techniques include receiving, from a first user, a first order request for a first portion of a bulk item that comprises a first portion a second portion. A second user may be identified based at least in part on geographic locations of the first user and the second user. A notification related to the first order request may be provided to the second user. A second order request for the second portion for the bulk item may be received from the second user. Discounted delivery costs for the first order request and the second order request may be calculated. The first portion of the item may be provided to the first user according to the discounted delivery costs. The second portion of the bulk item may be provided to the second user according to the discounted delivery costs.

20 Claims, 11 Drawing Sheets

US 10,152,743 B1

TECHNIQUES FOR PROVIDING SHARED-ORDER FUNCTIONALITY FOR A COMMUNITY OF USERS

BACKGROUND

It has become more common place for users to procure items from an electronic marketplace. In some cases, users may order items in bulk to obtain a discount, but can become frustrated with the requirements of storing so many items. Users may desire the discounted price for such orders, but don't foresee using the item often enough to justify the purchase. A user that proceeds with purchasing such items may find that one or more units expire before he is able to use them. Additionally, shipping costs for electronic marketplace orders can be cost prohibitive for some users. Accordingly, conventional techniques for providing multi-unit items to users via an electronic marketplace can be too expensive or too irritating for users resulting in a loss in potential sales for the marketplace provider.

BRIEF DESCRIPTION OF THE DRAWINGS

Various embodiments in accordance with the present disclosure will be described with reference to the drawings, in which.

DETAILED DESCRIPTION

Figure 1:
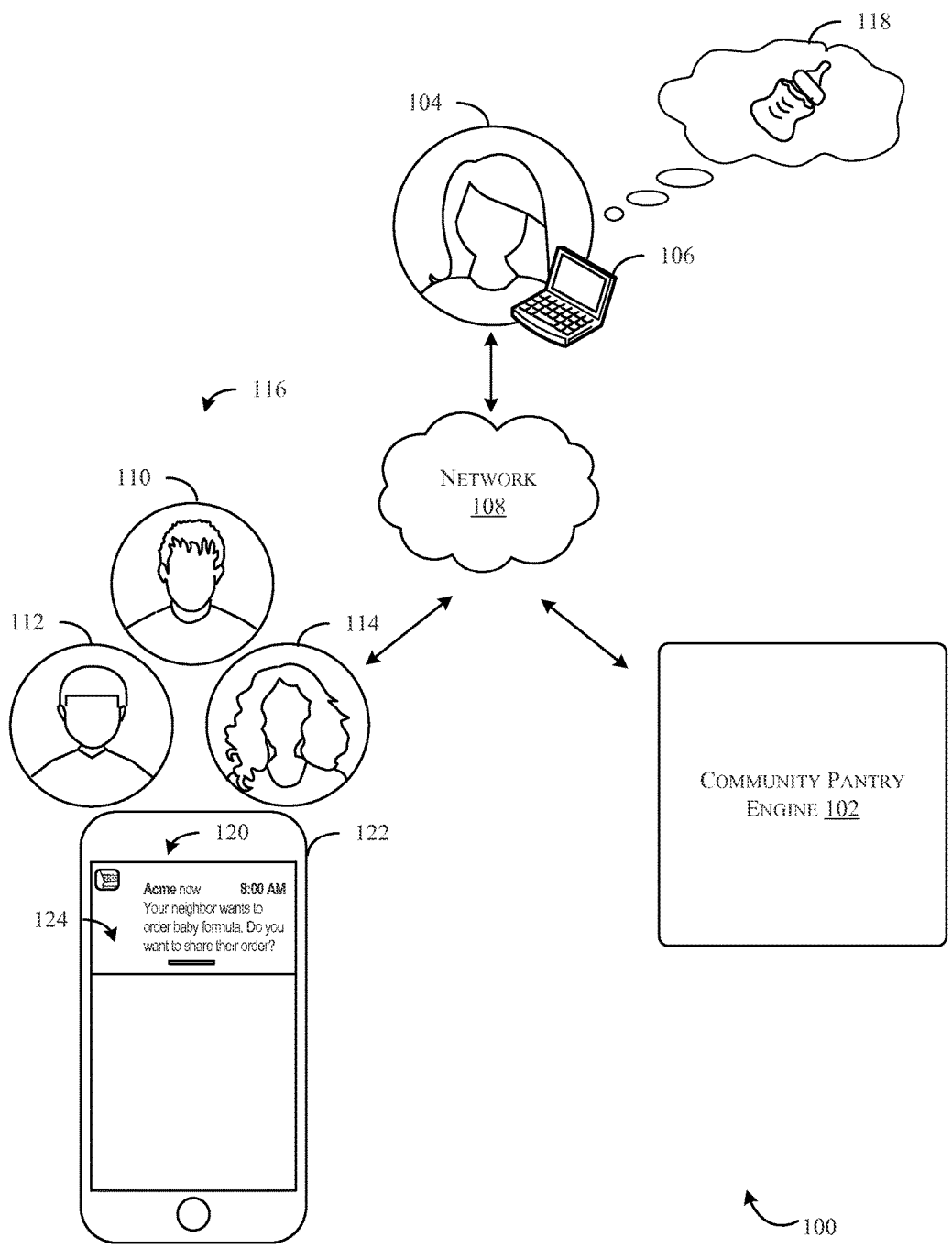
FIG. 1 is a schematic diagram illustrating an example environment suitable for implementing aspects of a community pantry engine, in accordance with at least one embodiment.

Techniques described herein are directed to providing community-shared orders for items offered in an electronic marketplace. An electronic marketplace, as used herein, is intended to refer to a computer-facilitated market for participants (e.g., buyers and sellers) to conduct transactions including commercial and/or financial transactions. An item may include, but is not limited to, a product, a service, one or more sellable sub-units, or anything else that may be managed or otherwise physically or electronically stored as inventory. In at least one example, a system configured to provide a community pantry engine may maintain, or otherwise obtain, inventory information related to one or more items offered for consumption on the electronic marketplace.

In at least one non-limiting example, the community pantry engine may provide an interface that provides a user the ability to associate herself with a group of users (e.g., a number of her neighbors). The user may search the inventory for an item that includes more than one sellable unit (e.g., four units). The item may be offered at a discounted price (e.g., less 25% of the regular purchase price) that is contingent on the item being purchased as part of a recurring order (e.g., an order that occurs once a month). In some cases, the user may not wish to purchase the item as-offered. For example, the cost may be too high or the item may include too many units. The community pantry engine may enable the user to indicate that she wishes to purchase only a portion of the item (e.g., one unit) and that remaining units should be offered to members of her group. The community pantry engine may provide information related to the recurring order to the group members in order to solicit other group members to share the order with the user. A group member may indicate that he will purchase the remaining units of the item. As a result of such an indication, the community pantry engine may distribute the purchase price and shipping costs between the purchasers. Upon processing a successful corresponding payment transactions, the community pantry engine may provide the corresponding portions of the item to the user and the group member.

In another non-limiting example, the community pantry engine may provide an interface for a user to indicate that he is interested in a particular item. The user may, for example, indicate an interest in an item by specifying a number of units (e.g., less than a total number of units offered as the item) that correspond to a portion of the item that he is interested in procuring. Upon receiving such an indication, the community pantry engine may seek out other potential purchasers of the remaining units of the item. For example, the community pantry engine may utilize a geographic location (e.g., a shipping address, GPS coordinate, etc.) of the user to determine potential purchasers (e.g., other users of the community pantry engine) that live nearby. Additionally, or alternatively, potential purchasers may be identified based on past-purchase history. The community pantry engine may provide the identified potential purchasers with information related to the item including the number of remaining units available for purchase. In some cases, purchasing transactions may not be initiated until each unit of the item has been vouched for by a user. As part of a purchase transaction, the community pantry engine may allocate costs of purchase and delivery to each of the purchasers. The item may be delivered to individual addresses of the purchasers or, in some cases, a single designated purchaser. In at least one example, designating a delivery location corresponding to a single purchaser of the shared order may result in lower shipping costs than if each portion of the item was shipped to an individual purchaser's shipping address.

Using such techniques, the community pantry engine may provide many advantages for both users and the electronic marketplace providers. For example, the community pantry engine may provide users the ability to purchase items at a more satisfying price and/or quantity. Further, the community pantry engine may provide users the ability to build relationships within their community through interaction with other users (e.g., via group interactions). Packaging waste may potentially be reduced, for example, by providing a common package for multiple portions of the item delivered to a shared location. The community pantry engine may further provide benefits with respect to environmental impacts by enabling a process by which delivery trucks may be utilized to deliver items in a more efficient manner (e.g., delivering to one house instead of multiple houses, reducing a number of separate trips by a delivery vehicle to a neighborhood/area, etc.). Accordingly, the electronic marketplace provider may realize greater profits by utilizing the community pantry engine as described above.

FIG. 1 is a schematic diagram illustrating an example environment 100 suitable for implementing aspects of a community pantry engine 102, in accordance with at least one embodiment. In at least one non-limiting example, the community pantry engine 102 may provide a network page that enables a user 104 to associate herself with a group of users (e.g., user 110, user 112, and/or user 114, collectively referred to herein as users 116). For example, the user 104 may utilize user device 106 (e.g., a laptop) to navigate to a network page provided by the community pantry engine 102 via network 108. The community pantry engine 102 may provide the user 104 with the ability to associate herself with other users. In some examples, the user 104 may initiate or join a group consisting of the user 104 and the users 116. The user 104 may then search for an item on the electronic marketplace.

The community pantry engine 102 may receive a subscription order request from the user 104 for an item 118 (e.g., six units of formula). A subscription order request may be utilized by the community pantry engine to generate recurring purchase orders for an item, where the purchase orders are generated at a periodic rate that corresponds to a frequency at which the user will be provided the item. In at least one example, the user 104 may specify that she only desires to purchase a portion of the item 118 (e.g., six units of formula) to be delivered at a particular periodic rate (e.g., once a month) for a period of time (e.g., six months from the original order) or as a recurring order (e.g., to be initiated at the periodic rate until halted). The community pantry engine 102 may determine, using the received subscription order, that the user 104 would prefer to purchase only a portion of the item 118 (e.g., based on past purchase history, return history, or the like). The community pantry engine 102 may provide a notification (e.g., a push notification 120 presented on a user device 122) to one of the users 116. Notifications discussed here may be graphical, audible, and/or haptic. For example, the push notification 120 may be graphically provided to inform the user 114 of information (e.g., text 124) regarding sharing a purchase of the item with another user, in this case, the user 104.

In accordance with at least one embodiment, the community pantry engine 102 may provide the user 114 the ability to submit a second subscription order that indicates that she will purchase a second portion of the item (e.g., the remaining four units of formula) at a second periodic rate that is a same as, or different than, the periodic rate requested by the user 104. The community pantry engine 102, upon determining that all six units of formula have been requested, may execute purchase and shipping workflows to process payment information and provide the user 104 and the user 114 with their corresponding portions of the item.

Figure 2:
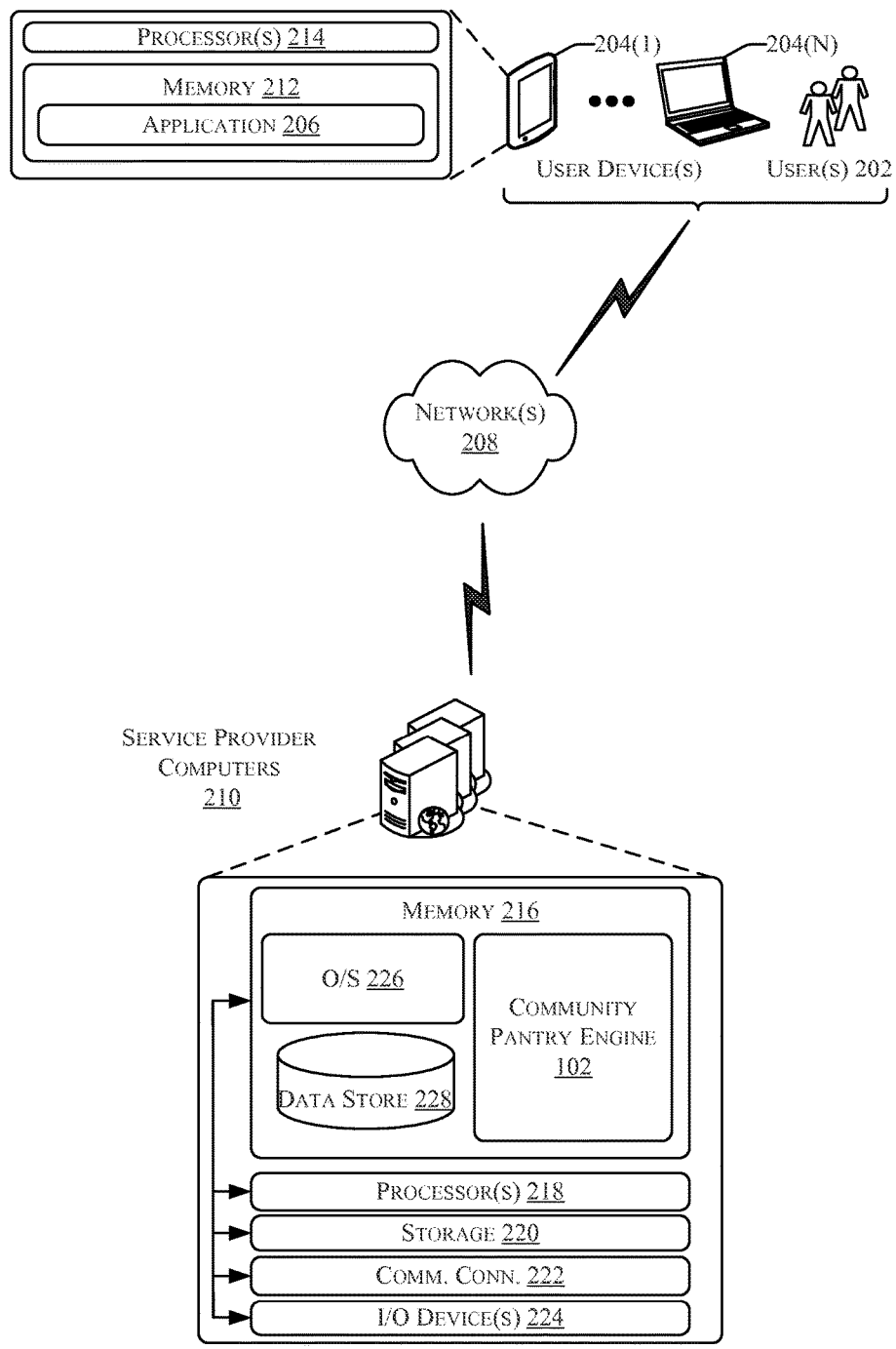
FIG. 2 is an example architecture of a community pantry engine, in accordance with at least one embodiment.

FIG. 2 is an example architecture 200 of the community pantry engine 102 of FIG. 1, in accordance with at least one embodiment. In architecture 200, one or more users 202 may utilize user computing devices 204(1)-(N) (collectively, user computing devices 204, e.g., the laptop 106 of FIG. 1) to access an application 206 (e.g., an application operating on the laptop 106) or a user interface accessible through the application 206 via one or more networks 208 (e.g., the network 108 of FIG. 1). In some aspects, the application 206 may be hosted, managed, and/or provided by a computing resources service or service provider, such as by utilizing one or more service provider computers 210. The one or more service provider computers 210 may, in some examples, provide computing resources such as, but not limited to, client entities, low latency data storage, durable data storage, data access, management, virtualization, cloud-based software solutions, electronic content performance management, etc. The one or more service provider computers 210 may also be operable to provide web hosting, computer application development, and/or implementation platforms, combinations of the foregoing, or the like to the one or more users 202.

In some examples, the networks 208 may include any one or a combination of many different types of networks, such as cable networks, the Internet, wireless networks, cellular networks, and other private and/or public networks. While the illustrated example represents the users 202 accessing the application 206 over the networks 208, the described techniques may equally apply in instances where the users 202 interact with the service provider computers 210 via the one or more user computing devices 204 over a landline phone, via a kiosk, or in any other suitable manner. It should be appreciated that the described techniques may apply in other client/server arrangements (e.g., set-top boxes, etc.), as well as in non-client/server arrangements (e.g., locally stored applications, etc.).

As described briefly above, the application 206 may allow the users 202 to interact with the service provider computers 210 such as to access information associated with providing items via an electronic marketplace. The one or more service provider computers 210, perhaps arranged in a cluster of servers or as a server farm, may host the application 206 and/or cloud-based software services. Other server architectures may also be used to host the application 206 and/or cloud-based software services. The application 206 may be capable of handling requests from many users 202 and serving, in response, various user interfaces that can be rendered at the user computing devices 204 such as, but not limited to, perceived latency or the like. The application 206 can present any suitable type of website that supports user interaction, including search engine sites. As discussed above, the described techniques can similarly be implemented outside of the application 206, such as with other applications running on the user computing devices 204.

The user computing devices 204 (e.g., the laptop 106 of FIG. 1) may be any suitable type of computing device such as, but not limited to, a mobile phone, a smartphone, a personal digital assistant (PDA), a laptop computer, a desktop computer, a thin-client device, a tablet PC, an electronic book (e-book) reader, etc. In some examples, the user computing devices 204 may be in communication with the service provider computers 210 via the networks 208, or via other network connections. Additionally, the user computing devices 204 may be part of the distributed system managed by, controlled by, or otherwise part of the service provider computers 210.

In one illustrative configuration, the user computing devices 204 may include at least one memory 212 and one or more processing units (or processor(s)) 214. The processor(s) 214 may be implemented as appropriate in hardware, computer-executable instructions, firmware, or combinations thereof. Computer-executable instructions or firmware implementations of the processor(s) 214 may include computer-executable or machine-executable instructions written in any suitable programming language to perform the various functions described.

The memory 212 may store program instructions that are loadable and executable on the processor(s) 214, as well as data generated during the execution of these programs. Depending on the configuration and type of user computing device, the memory 212 may be volatile (such as random access memory (RAM)) and/or non-volatile (such as read-only memory (ROM), flash memory, etc.). The user computing devices 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 212 may include multiple different types of memory, such as static random access memory (SRAM), dynamic random access memory (DRAM), or ROM.

Turning to the contents of the memory 212 in more detail, the memory 212 may include an operating system and one or more application programs, modules, or services for implementing the features disclosed herein including at least the perceived latency, such as via the application 206 or dedicated applications (e.g., smart phone applications, tablet applications, etc.). The application 206 may be configured to receive, store, and/or display a network page or other interface for interacting with the service provider computers 210. Additionally, the memory 212 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

In some aspects, the service provider computers 210 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computers 210 may be in communication with the user computing devices 204 and/or other service providers via the networks 208 or via other network connections. The service provider computers 210 may include one or more servers, perhaps arranged in a cluster, as a server farm, or as individual servers not associated with one another. These servers may be configured to implement the content performance management described herein as part of an integrated, distributed computing environment.

In one illustrative configuration, the service provider computers 210 may include at least one memory 216 and one or more processing units (or processor(s)) 218. The processor(s) 218 may be implemented as appropriate in hardware, computer-executable instructions, firmware, or combinations thereof. Computer-executable instruction or firmware implementations of the processor(s) 218 may include computer-executable or machine-executable instructions written in any suitable programming language to perform the various functions described.

The memory 216 may store program instructions that are loadable and executable on the processor(s) 218, as well as data generated during the execution of these programs. Depending on the configuration and type of service provider computers 210, the memory 216 may be volatile (such as RAM) and/or non-volatile (such as ROM, flash memory, etc.). The service provider computers 210 or servers may also include additional storage 220, which may include removable storage and/or non-removable storage. The additional storage 220 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 216 may include multiple different types of memory, such as SRAM, DRAM, or ROM.

The memory 216, the additional storage 220, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 216 and the additional storage 220 are all examples of computer storage media. Additional types of computer storage media that may be present in the service provider computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 210 may also contain communications connection(s) 222 that allow the service provider computers 210 to communicate with a stored database, another computing device or server, user terminals and/or other devices on the networks 208. The service provider computers 210 may also include I/O device(s) 224, such as a keyboard, a mouse, a pen, a voice input device, a touch input device, a display, speakers, a printer, etc.

Turning to the contents of the memory 216 in more detail and will be described in further detail in FIG. 3, the memory 216 may include an operating system 226, one or more data stores 228, and/or one or more application programs, modules, or services for implementing the features disclosed herein including the community pantry engine 102 of FIG. 1.

Figure 3:
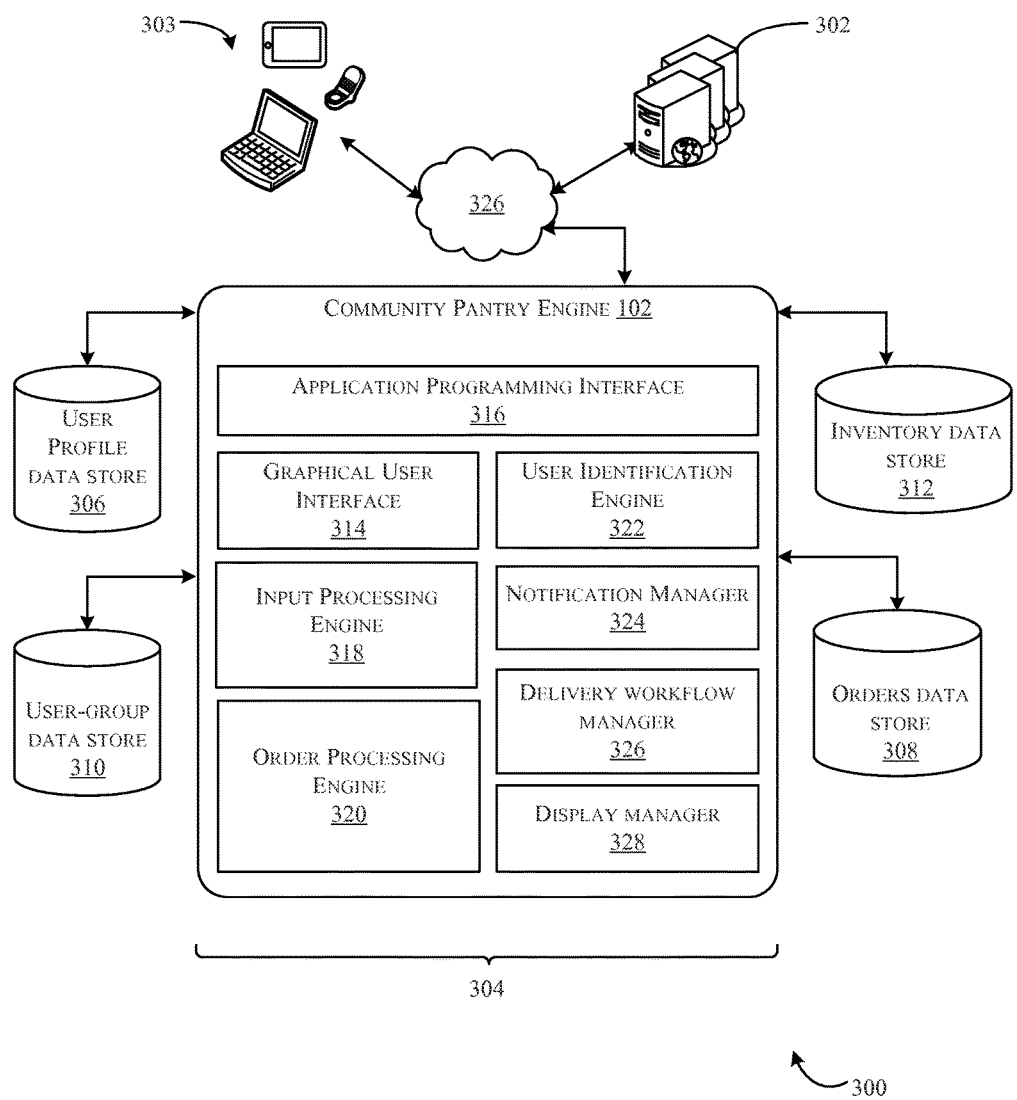
FIG. 3 is a schematic that illustrates an example computer architecture for the community pantry engine, including a plurality of modules that may carry out various embodiments.

FIG. 3 is a schematic that illustrates an example computer architecture 300 for the community pantry engine 102 of FIG. 1, including a plurality of modules 304 that may carry out various embodiments. The modules 304 may be software modules, hardware modules, or a combination thereof. If the modules 304 are software modules, the modules 304 can be embodied on a computer readable medium and processed by a processor in any of the computer systems described herein. It should be noted that any module or data store described herein, may be, in some embodiments, a service responsible for managing data of the type required to make corresponding calculations. The modules 304 may be configured in the manner suggested in FIG. 3 or the modules 304 may exist as separate modules or services external to the community pantry engine 102. Any combination of modules 304 may be executed, in whole or in part, on service provider computers 302 (e.g., service provider computers 210 of FIG. 2). Likewise, any combination of modules 304 may be executed, in whole or in part, on user device 303 (e.g., the user computing devices 204 of FIG. 2), for example, as part of an application executing on user device(s) 303 (e.g., the application 206 of FIG. 2).

In the embodiment shown in the drawings, a user profile data store 306, an orders data store 308, a user-group data store 310, and an inventory data store 312 are shown, although data can be maintained, derived, or otherwise accessed from various data stores, either remote or local to the community pantry engine 102, to achieve the functions described herein. Some combination of the data stores depicted in FIG. 3 may be located on the service provider computers 302 and/or may be located on the user device(s) 303 (e.g., the user computing devices 204 of FIG. 2). The community pantry engine 102, shown in FIG. 3, includes various modules such as a graphical user interface 314, an application programming interface 316, an input processing engine 318, an order processing engine 320, a user identification engine 322, a notification manager 324, a delivery workflow manager 326, and a display manager 328. Some functions of the modules 314, 316, 318, 320, 322, 324, 326, and 328 are described below. However, for the benefit of the reader, a brief, non-limiting description of each of the modules is provided in the following paragraphs.

In accordance with at least one embodiment, a process is enabled for utilizing the community pantry engine 102 of FIG. 1. For example, a user (e.g., the user 104 of FIG. 1) may utilize the user device(s) 303 to interact with service provider computers 302 (e.g., the service provider computers 210 of FIG. 2) to provide user-interest information, information related to a group of users, and/or information related to an order via graphical user interface 314 and application programming interface 316, both components of the community pantry engine 102. As a side, graphical user interface 314 and application programming interface 316 may be utilized in any suitable example described herein as a means for receiving, or providing information, by the community pantry engine 102. The input processing engine 318 may interact with the user profile data store 306, the user-group data store 310, the inventory data store 312, and the orders data store 308 in accordance with various embodiments.

For example, the community pantry engine 102 may receive user-interest information indicating interest by the user 104 in the item 118. Such information may be inputted by the user via a network page provided by the display manager, a component of the community pantry engine 102 responsible for providing information to the user via network pages provided by the service provider computers 302. User-interest information may indicate that the user 104 is interested in the item 118 but does not currently desire to purchase the item. User-interest information may be stored by the input processing engine 318 in user profile data store 306. Input processing engine 318 may further be responsible for receiving and processing information related to a group of users (e.g., initialization information for a group, an association between a user and a group, communications between users of a group, etc.). Information related to a group of users may be processed by the input processing engine 318 and stored in the user-group data store 310. Input processing engine 318 may further be responsible for receiving and processing information related to an order (e.g., a purchase order). Input processing engine 318 may store order information in orders data store 308, user profile data store 306, or any suitable location responsible for storing such information.

In accordance with at least one embodiment, the order processing engine 320 may receive (e.g., from the input processing engine 318) information about an order. The order processing engine 320 may determine (e.g., utilizing the order information or information associated with the item from the inventory data store 312) that the order specifies an item (e.g., the item 118) that includes multiple sub-units. Upon determining that each sub-unit of the item 118 is included in the order, or upon another suitable determination, the order processing engine 320, may process the order information to complete a purchase transaction. Information of the purchase may be associated with user profile information stored in user profile data store 306. The order processing engine 320 may interact with delivery workflow manager 326 to communicate shipping information for the order. In at least one example, upon determining that each sub-unit of the item 118 has not been included in the order, the order processing engine 320 may communicate the order information to user identification engine 322 and/or store the incomplete order in orders data store 308, a data store responsible for storing such information.

In at least one example, the user identification engine 322 may receive order information from order processing engine 320 (e.g., order information that excludes at least one sub-unit for the item 118) or, alternatively, obtain order information (e.g., periodically) from orders data store 308. Additionally, or alternatively, the user identification engine 322 may periodically (e.g., at predetermined times) select an item (e.g., the item 118) from the inventory data store 312 for which potential purchasers (e.g., other users of the electronic marketplace) are to be identified. The user identification engine 322 may identify a number of users utilizing, for example, the received order information (e.g., including a group of users specified by the purchaser). In at least one embodiment, the user identification engine 322 may interact with the user profile data store 306 to determine a number of users based on a geographical distance between the purchaser and a user, a shipping address, a billing address, past purchase history of the users, or the like. Upon identifying a number of users (e.g., potential purchasers for the remaining sub-units of the item 118) user identification engine 322 may communicate identified user identification information to the notification manager 324.

Upon receipt of user identification information, or at any suitable time, the notification manager 324 may generate a number of notifications to a number of users. For example, the notification manager 324 may cause a push notification to be displayed on a user device of an identified user. For example, the notification manager 324 may enable a remote push notification service to disseminate a push notification to one or more user devices. The notification manager 324 may additionally, or alternatively, communicate an email message, a text message, a social media post, or any suitable form of electronic communication to a system remote to the community pantry engine 102. Additionally, or alternatively, the notification manager 324 may communicate the notification to display manager 328 for display on a network page of the service provider computers 302.

In accordance with at least one embodiment, the delivery workflow manager 326 may receive order information from the order processing engine 320 that indicates a completed purchase (e.g., every sub-unit of the item has been purchased). Delivery workflow manager 326 may be responsible for executing a number of workflows to provide a purchased portion of the item to the purchaser. For each purchased portion of the item, delivery workflow manager 326 may determine a number of shipping containers (e.g., a box, a container that includes a locking mechanism and/or a weight scale, etc.) and/or packaging specifications to utilize during the delivery process. A packaging specification can include specific requirements related to how an item should be packed (e.g., wrapped in materials intended to prevent damage to the item while in transit) and/or shipping labels. Delivery workflow manager 326 may generate instructions for dividing an item into sub-items, a number of warning labels, nutritional labels, or the like, for each portion of the item. Delivery workflow manager 326 may determine one or more delivery routes to be responsible for delivering a portion of the item, or the item as a whole.

Figure 4:
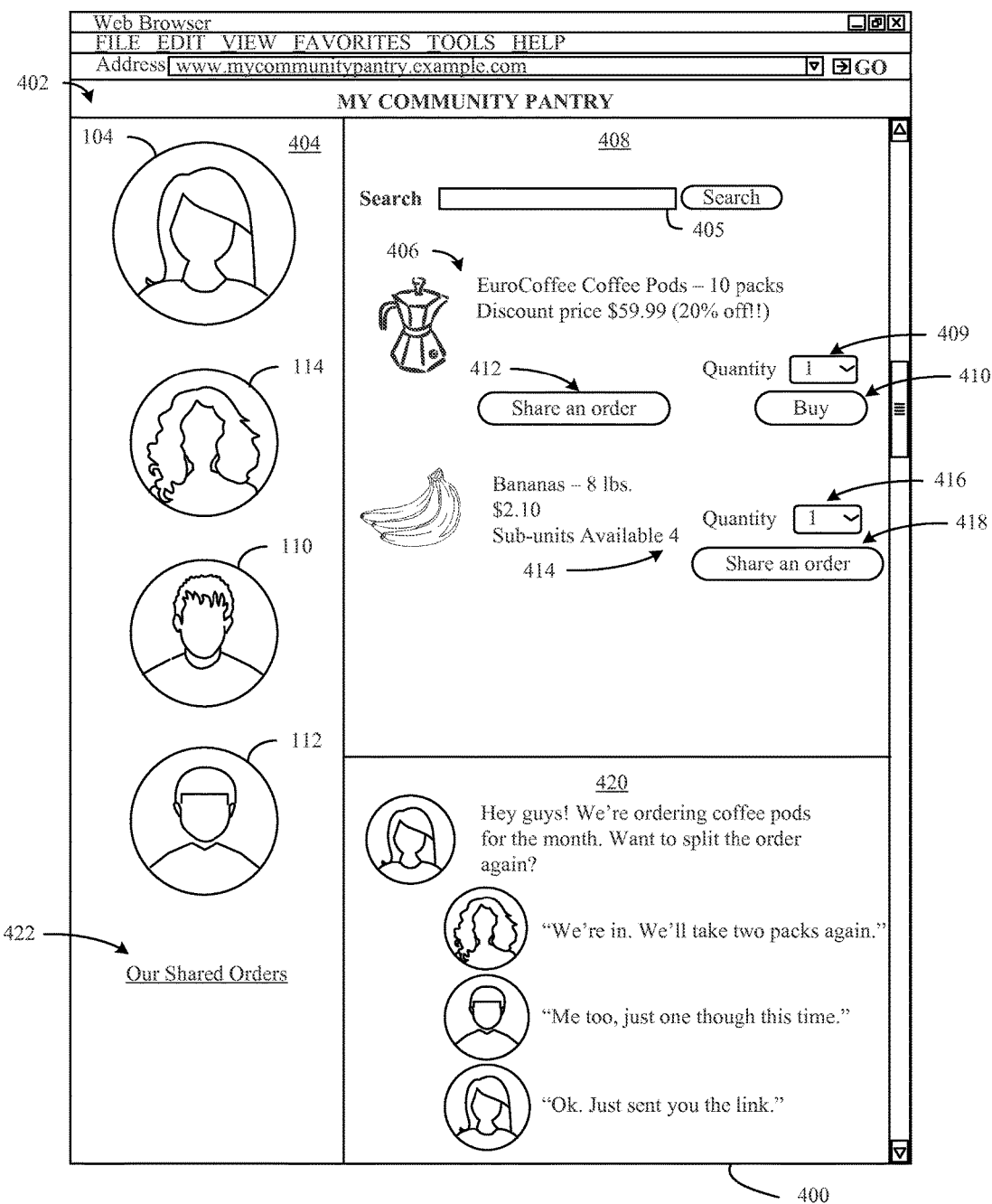
FIG. 4 is an schematic diagram illustrating an example interface suitable for implementing aspects of the community pantry engine, in accordance with at least one embodiment.

FIG. 4 is a schematic diagram illustrating an example interface 400 suitable for implementing aspects of the community pantry engine 102 of FIG. 3, in accordance with at least one embodiment. The network page 402, provided by the community pantry engine 102, may be provided in accordance with the illustration of FIG. 4, or the network page 402 may be different than the network page 402 illustration of FIG. 4. In at least one example, the user 104 may join a group consisting of one or more users (e.g., the user 110, the user 112, and the user 114). Group membership pane 404 may be provided for displaying users that are associated with a group.

In at least one embodiment, the community pantry engine 102 may provide the user 104 the ability to search, via search bar 405, for example, for friends, neighbors, associates, or strangers in order to identify another user with which to share the order. Additionally, or alternatively, the search bar 405 (or a different search bar not depicted in FIG. 4) may be utilized to provide a search query related to various items located in inventory (e.g., on inventory data store 312 of FIG. 3). For example, the user 104 may search for "coffee pods." The community pantry engine 102 may receive (e.g., via application programming interface 316 and the interface 400) the search query. The community pantry engine may execute the search query utilizing a search algorithm technique to identify the item 406 (e.g., a ten pack of coffee pods). Viewing pane 408 may be used by the display manager 328 to display information related to the item 406.

As a non-limiting example, the item 406 may include ten sub-units (e.g., packs) of coffee pods. A user may utilize drop-down selector 409 to specify a quantity of the ten packs of coffee pods he wants to purchase. The user may then select a button 410 to indicate initialization of a purchase transaction process. In another example, the user may select a "share an order" button 412. The user may be prompted by the community pantry engine 102 to provide a desired quantity of the 10 packs. However, in some cases, the user may indicate interest using the "share an order" button 412 without having to specify a particular quantity. In this case, if another user of the community pantry engine 102 (e.g., a user not depicted in FIG. 4) indicates an interest in the item 406, a notification may be sent (e.g., by notification manager 324 of FIG. 3) to the user 104 indicating that another user is interested in sharing an order. If the user 104 has not provided a specific quantity, she may be prompted at this time (e.g., by the order processing engine 320 of FIG. 3 utilizing display manager 328 of FIG. 3).

In accordance with at least one embodiment, upon selecting "share an order" button 412, the user may further be prompted to indicate whether the user wants to share an order with a particular group member (e.g., the user 112), all users in a group (e.g., the user 110, the user 112, and the user 114), a subset of the group, or whether the user prefers that the community pantry engine 102 attempt to identify users who are interested in sharing the order for the item 406. As a further example, bananas may be offered at a discounted price (e.g., $2.10) when, for example, bought in bulk (e.g., eight pound increments). The user 104 may be intrigued by the discount price, but does not want to purchase the whole eight pounds of bananas as they would likely go bad before the user 104 could consume them. In at least one example, a number of sub-units may be indicated at 414. The user 104 may indicate a quantity at 416. In some cases, if the quantity is less than the sub-units available at 414, the button 418 may be utilized to indicate that the user is interested in sharing the order, and that the user is interested in purchasing the number entered at 416. In some cases, if the quantity is equal to the sub-units available at 414 indicating that the user 104 wants the entire eight pounds of bananas after all, the button 418 may display "buy" or suitable text to indicate that the user 104 may select the button 418 to initiate a purchase order.

In at least one non-limiting example, the user 104, the user 110, the user 112, and/or the user 114 may communicate with one another using the interface 400 provided by the community pantry engine 102. For example, as depicted in communications pane 420, messages (e.g., posts) may be exchanged between users in order to coordinate shared orders. Assuming that users of the group have shared past orders, the shared past orders may be viewable to group members via, for example, a hyperlink 422.

Figure 5:
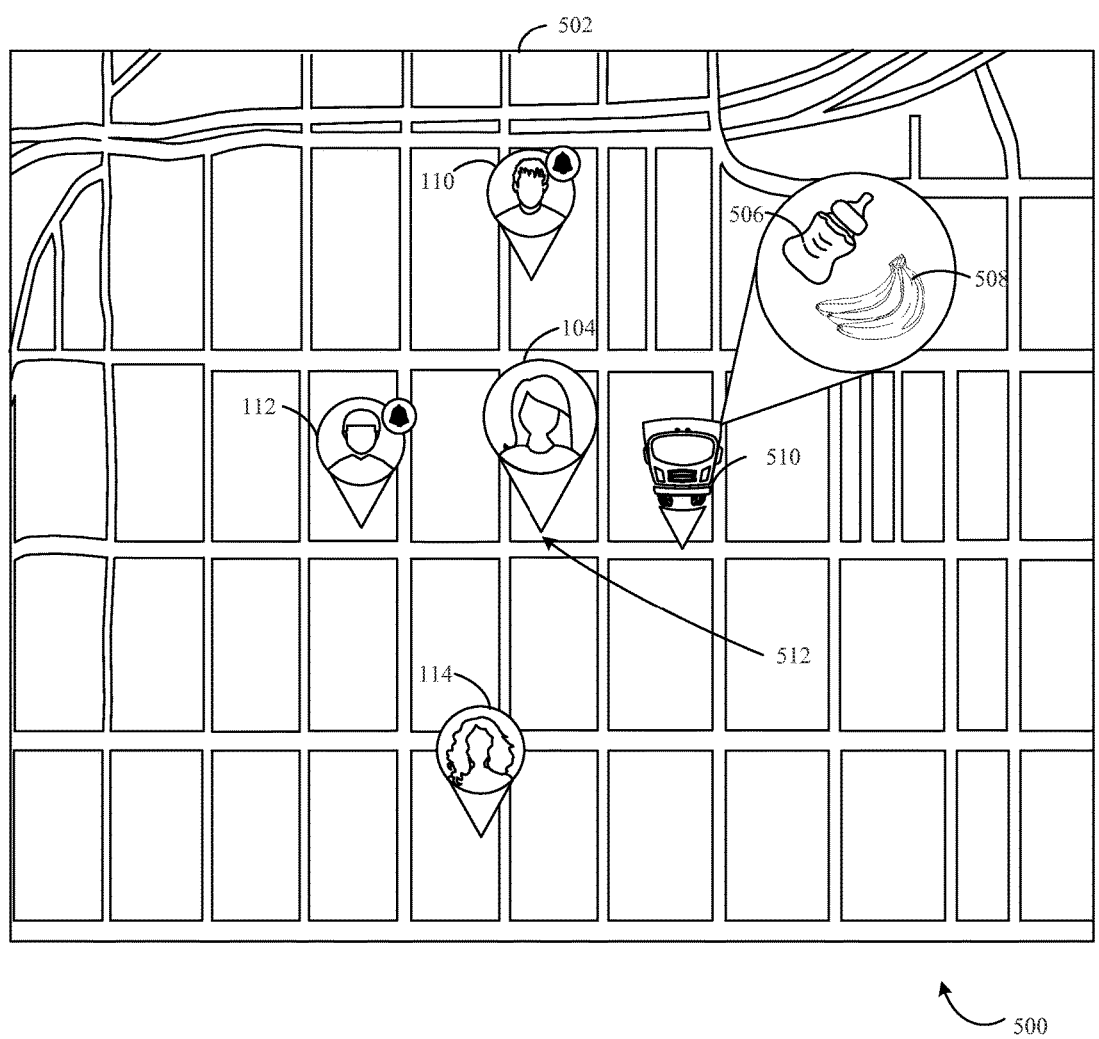
FIG. 5 is a schematic diagram illustrating an example environment suitable for identifying potential users of the community pantry engine, in accordance with at least one embodiment.

FIG. 5 is a schematic diagram illustrating an example environment 500 suitable for identifying potential users of the community pantry engine 102 of FIG. 3, in accordance with at least one embodiment. In accordance with at least one embodiment, a number of users may be located at various locations throughout a geographical area (e.g., neighborhood 502). The user 110 may indicate an interest (e.g., via user preference information) that he is generally interested in baby products (e.g., formula, diapers, wipes, etc.). The user 110 may indicate such user preference information using a network page and/or interface provided by the community pantry engine 102 (e.g., the display manager 328). The user preference information may be stored in, for example, the user profile data store 306 of FIG.

3 (e.g., as an association to the user 110). Additionally, or alternatively, the user 112 may have purchased bananas in the past. Further, the user 114 may not have indicated an interest in item 506 or item 508, nor purchased item 506 or item 508 in the past, nor does the user 114 belong to a group that includes the user 104.

In at least one non-limiting example, the user 104 may order the item 506 and/or the item 508. The user 104 may have ordered such items via a one-time or via a subscription order. In at least one example, the order processing engine 320 of FIG. 3 may determine from received order information that a delivery will be made to location 512 (e.g., by delivery truck 510 on a particular day). Upon such a determination, the order processing engine 320 may communicate the order information to user identification engine 322.

Upon receiving order information, or at any suitable time, the user identification engine 322 may identify a number of users that may potentially share the order, delivery costs, or delivery days. For example, the user identification engine 322 may identify the user 110 as a potential purchaser based on previously-received user preference information indicating that the user 110 is interested in baby products. Identifying the user 110 may further be based on the inclusion of the item 506 (e.g., baby formula) in the order for the user 114. For example, if the user 104 has ordered the item 506 with a subscription order, the user 104 may have indicated via user preference information, that she is interested in sharing her subscription orders with others, or at least that she is willing to share her subscription order for the item 506 with other users.

Upon identifying the user 110 as a potential purchaser, the notification manager 324 may provide respective notifications to the user 110 and the user 104 suggesting a possible shared subscription order of item 506 in the future. The user 104 and the user 110, if amiable to the suggestion, may each provide feedback to the community pantry engine 102 indicating that he, or she, would like to share the order. Such feedback may include a user-specified quantity corresponding to a portion or amount (e.g., a number of sub-units) that the particular user is willing to purchase from the item 506. The community pantry engine 102 may facilitate communications between the user 104 and the user 110. If the users come to an agreement on what portions each are willing to purchase, one, or both, of the users may provide the information to the community pantry engine 102. For example, the user 104 may request that the subscription order be modified to indicate that the user 110 will be purchasing a portion of the item 506. The community pantry engine 102 may, in turn, prompt the user 110 for approval and payment information. If the user 110 agrees to the shared order, the community pantry engine 102 may update the order (e.g., stored in the orders data store 308) and provide the corresponding portions of the item 506 accordingly.

In accordance with at least one example, the user 104 may be purchasing the item 506 and the item 508 as a one-time, or subscription order. The user identification engine 322 may identify the user 112 as a potential purchaser (e.g., an indirect purchaser) based on, for example, a geographical distance between the user 112 and the user 104 (e.g., as determined using respective shipping addresses). The user identification engine 322 may identify the user 112 further based on a past purchase made by the user 112. In at least one example, the user 112 may be notified that the delivery truck 510 will be at the location 512 on a particular day. In some cases, the user 112 may be offered discounted delivery fees if he chooses to order an item to be delivered on a same day as the item 506 and the item 508. Additionally, or alternatively, the user 112 may be offered discounted delivery fees if he chooses to modify an existing order to be delivered on the same day as the item 506 and the item 508. If the user 112 chooses to order an item, or modifies an existing order, order information (e.g., for a new or modified order) may be received by order processing engine 320. Upon receipt, order processing engine 320 may allocate a discounted delivery fee to the user 112. In at least one example, in response to allocating the discounted delivery fee to the user 112, the order processing engine 320 may additionally adjust the delivery fee for the user 104 to a lower amount. The user 104 may be notified by notification manager 324 that her delivery costs have been reduced. In this manner, the electronic marketplace may provide incentives for users (e.g., within a threshold distance apart) to order items on the same day as other users in the area which will allow delivery trucks used by the electronic marketplace provider, to provide items to users in a more efficient manner (e.g., making one trip instead of two).

In accordance with at least one embodiment, the user 114 does not belong to any groups associated with the user 104. Further, the user 114 may have indicated via user preference information that she is not interested in sharing orders (e.g., one-time orders and/or subscription orders). The user 114 may have further indicated that she does not wish to share delivery costs. In this non-limiting example, the user 114 may not be identified by the user identification engine 322 as a potential purchaser, and accordingly, no notification will be received by the user 114 for any activity discussed above with respect to FIG. 5.

Figure 6:
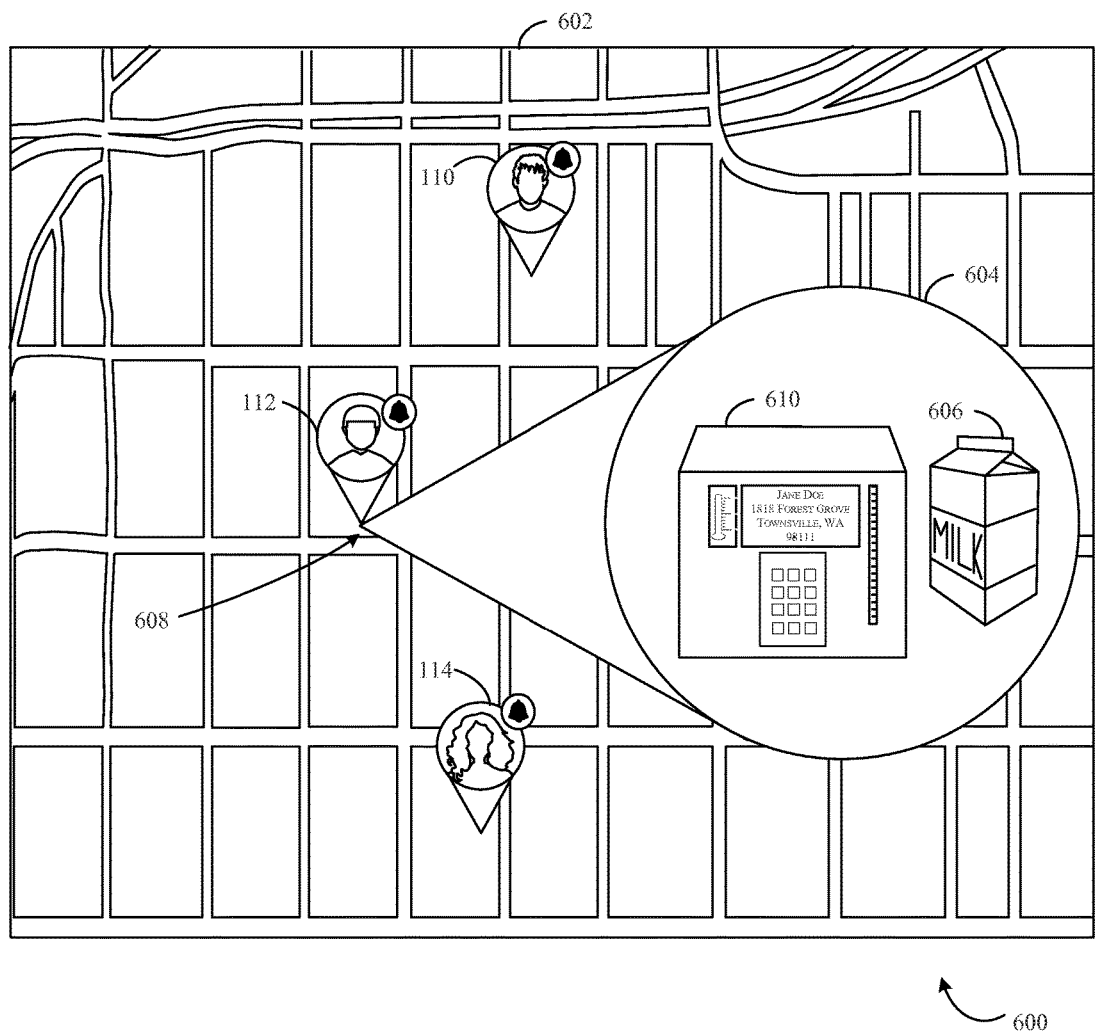
FIG. 6 is a schematic diagram illustrating an example environment suitable for providing a shared order to a shared delivery location utilizing the community pantry engine, in accordance with at least one embodiment.

FIG. 6 is a schematic diagram illustrating an example environment 600 suitable for providing a shared order to a shared delivery location utilizing the community pantry engine 102 of FIG. 1, in accordance with at least one embodiment. For example, as in FIG. 5, a number of users are located at various locations throughout a geographical area 602 (e.g., the neighborhood 502 of FIG. 5). The user 110, the user 112, and the user 114 may initiate a shared order 604 as discussed in the examples above. In at least one embodiment, a shared delivery location may be utilized for the shared order. As a non-limiting example, the shared order may include six half gallons of milk 606 (and/or other shared order items as multiple types of items are possible in any shared order). The user 110, the user 112, and the user 114 may collectively decide to share a shared delivery location. In at least one example, a user may designate their own shipping address, or nominate another user's shipping address, for the shared delivery location of the shared order.

For example, the shared order may be delivered to a shared delivery location (e.g., a shared delivery location 608, corresponding to a shipping address and/or delivery location associated with the user 112). In at least one example, the shipping costs may be allocated by the community pantry engine 102 between the user 110, the user 112, and the user 114. The shipping costs may be allocated proportionally with respect to a portion of the shared order that is attributable to a respective user (e.g., a number of sub-units of the item bought by the user), or in another suitable manner. To illustrate, if each user in the example orders two half-gallons units of the milk 606, each user may be allocated a third (e.g., or substantially a third) of the delivery costs.

In accordance with at least one embodiment, delivering a shared order 604 to the shared delivery location 608 may include utilizing a shared delivery container 610. The shared delivery container 610 may include a locking mechanism and/or a weight scale. Labels for milk 606 may be generated by the delivery workflow manager 326 of FIG. 3 as part of, for example, a shipping process. The delivery workflow manager 326 may provide instructions for packaging the milk 606, for example, in shared delivery container 610. For example, the delivery workflow manager 326 may cause any suitable number of the milk 606 to be labeled. For example, a warning label, a nutritional label, and/or a label identifying the purchaser may be generated for the milk 606. The generated instructions may indicate that labels (e.g., identifying the purchaser) are to be affixed to the milk 606. Upon delivery of the shared order 604, the user 110, for example, may receive a notification from the notification manager 324 indicating that the shared order 604 was delivered to the shared delivery location 608 (e.g., in this case the shipping address of the user 112). Notification manager 324 may, in some cases, provide a key code or other password to the user 112 that can be utilized by the user 112 to unlock the shared delivery container 610. The delivery workflow manager 326 may further cause the shared delivery container 610 to be configured to open upon input of a key code or password. The key code may remain consistent with respect to the shared delivery container 610, or the key code for the shared delivery container 610 may be changed periodically (e.g., prior to each delivery for which the shared delivery container 610 is utilized).

In some examples, the shared delivery container 610 may include a weight scale or another suitable mechanism for measuring weight. The weight scale may be utilized to verify proper distribution of the milk 606. For example, the user 110 may arrive at the shared delivery container 610 and enter in (e.g., via a keypad device) the key code/password previously received in a notification. Accordingly, the shared delivery container 610 may open and the user 110 may retrieve his portion of the milk 606. In some cases, a weight scale located on the shared delivery container 610 may determine that the user 110 take too much of the milk 606, or not enough of the milk 606 (e.g., based on an expected weight differential for measurements taken before and after the user 110 retrieves an item from the shared delivery container 610). If the user 110 takes too few, or too many, of the milk 606, he may be alerted by an audible or visual indicator initiated from a device located on the shared delivery container 610. In at least one examples, weight measurements may be used by the community pantry engine 102 to charge the user 110 a higher price when the user 110 takes more than what was paid for, or to process a refund for the user 110 when the user 110 takes less than what was paid for.

Figure 7:
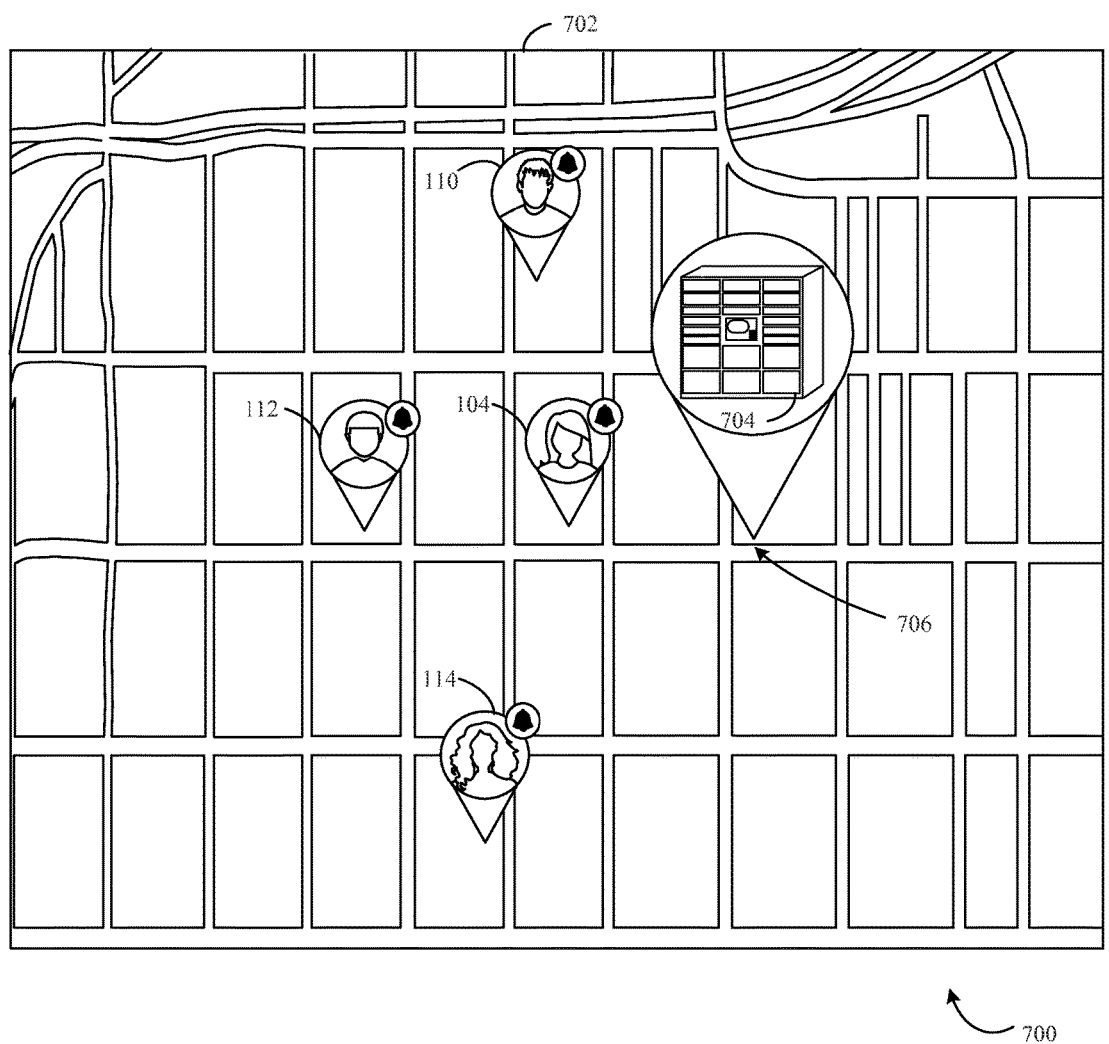
FIG. 7 is a schematic diagram illustrating an additional example environment suitable for providing a shared order to a shared delivery location utilizing the community pantry engine, in accordance with at least one embodiment.

FIG. 7 is a schematic diagram illustrating an additional example environment 700 suitable for providing a shared order to a shared delivery location utilizing the community pantry engine 102 of FIG. 1, in accordance with at least one embodiment. In accordance with at least one embodiment, a shared order 604 to the shared delivery location 608 may include utilizing a shared delivery container 610. For example, a number of users are located at various locations throughout a geographical area 702 (e.g., the geographical area 602 of FIG. 6). The user 110, the user 112, the user 114, and the user 104 may initiate a shared order as discussed in the examples above. In at least one embodiment, a shared delivery location (e.g., a locker 704) may be utilized for the shared order. Locker 704 may include multiple lockable compartments where the items of the shared order may be stored. In some cases, one compartment may be utilized for the shared order while, in other cases, multiple compartments may be used.

In at least one example, the community pantry engine 102 may determine that the number of users in the shared order does not exceed a threshold (e.g., 50 users within a 4 block radius) needed to offer delivery to each of the user's respective shipping addresses. Accordingly, the delivery workflow manager 326 may cause the shared order to be delivered to the shared location (e.g., the locker 704 at a location 706). The locker 704 may constitute a mobile storage system that is provided at location 706 as part of a process for providing the items of the shared order of the users of FIG. 7.

Figure 8:
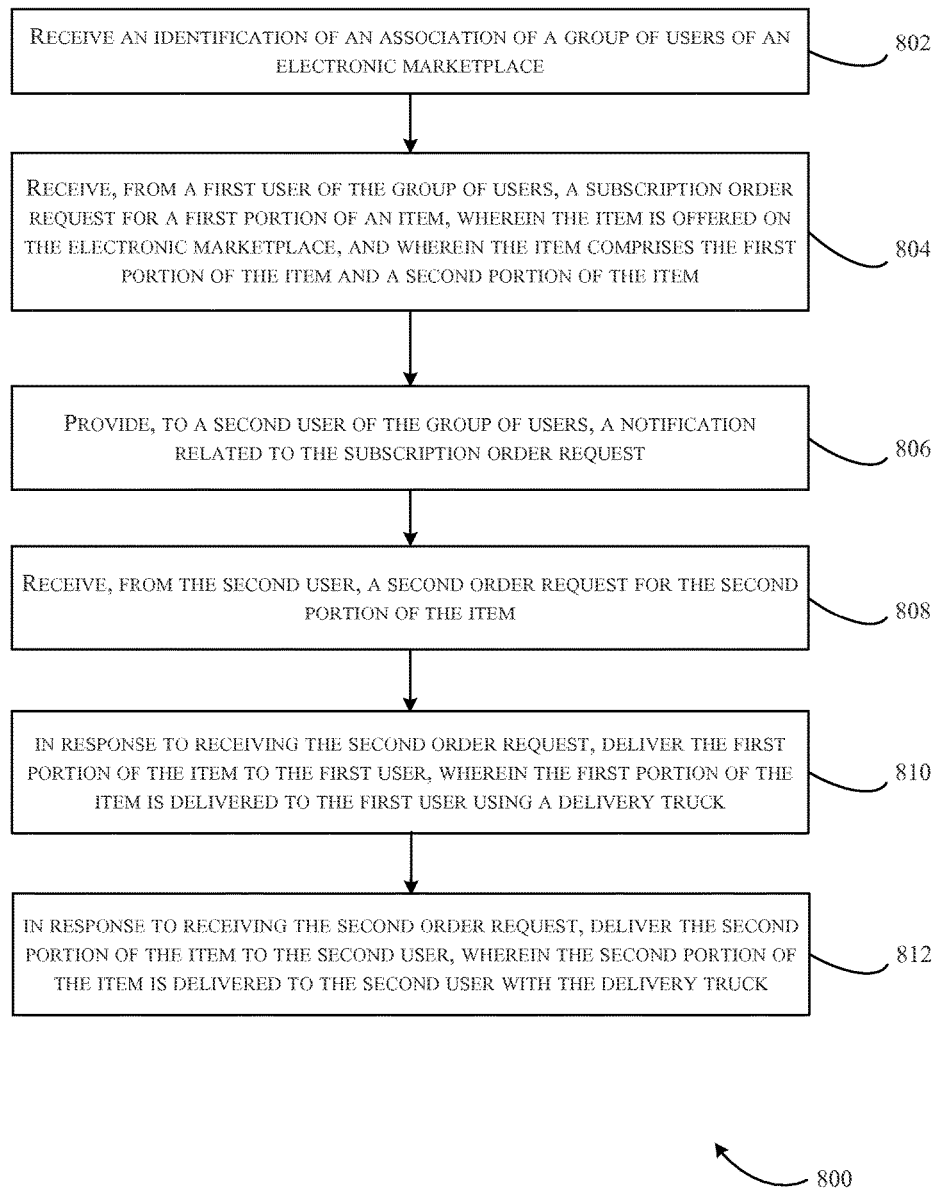
FIG. 8 is a flowchart illustrating a method for providing shared-order functionality to users of an electronic marketplace utilizing the community pantry engine, in accordance with at least one embodiment.

FIG. 8 is a flowchart illustrating a method 800 for providing shared order functionality for users of an electronic marketplace utilizing the community pantry engine 102 of FIG. 1, in accordance with at least one embodiment. The method may begin at block 802, where one or more data processors (e.g., one or more data processors, such as hardware computer processors (e.g., 'CPUs'), executing instructions related to the community pantry engine 102 of FIG. 1) receive an identification of an association of a group of users of an electronic marketplace. In at least one example, the input processing engine 318 of FIG. 3 may receive group association information and store such information in, for example, user-group data store 310.

At block 804, a subscription order request for a first portion of an item is received from a first user of the group of users (e.g., by the order processing engine 320 of FIG. 3). In at least one example, the item is offered on an electronic marketplace. In some cases, the item comprises the first portion of the item and a second portion of the item.

At block 806, a notification related to the subscription order request may be provided to a second user of the group of users. For example, all the users of the group, or a suitable subset of the group may be provided a notification related to the subscription order request. The notification, in some cases, may include details about the subscription order request.

At block 808, a second order request for the second portion of the item may be received from the second user (e.g., by the order processing engine 320) utilizing an interface provided by the community pantry engine 102.

At block 810, the first portion of the item may be delivered to the first user in response to receiving the second order request, wherein the first portion of the item is delivered to the first user using a delivery truck. Though delivery trucks are discussed throughout examples included herein, it should be understood that any suitable vehicle may be substituted.

At block 812, the second portion of the item may be delivered to the second user in response to receiving the second order request, wherein the second portion of the item is delivered to the second user using a delivery truck. Though delivery trucks are discussed throughout examples included herein, it should be understood that any suitable vehicle may be substituted.

Figure 9:
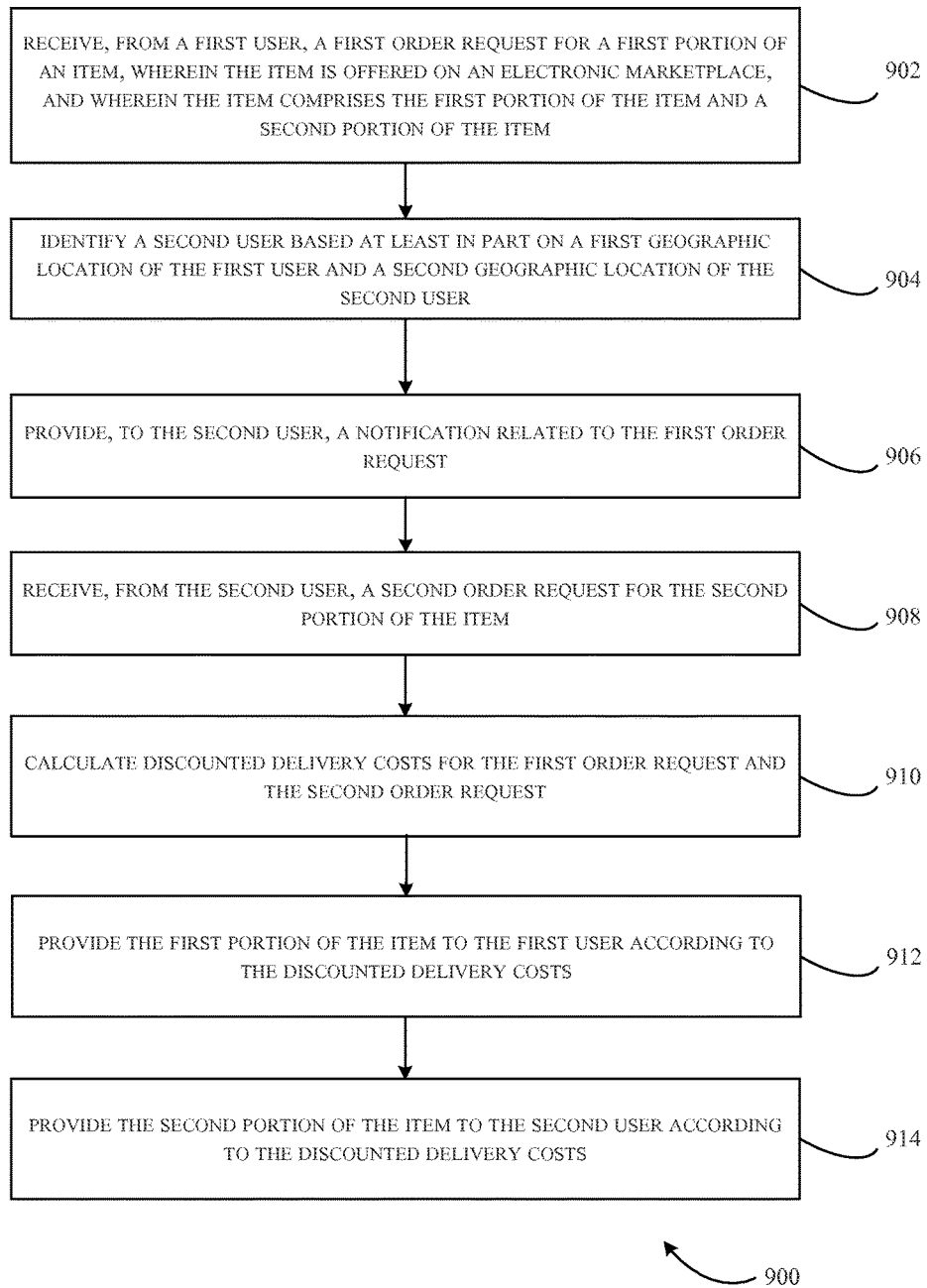
FIG. 9 is a flowchart illustrating another method for providing shared-order functionality to users of an electronic marketplace utilizing the community pantry engine, in accordance with at least one further embodiment.

FIG. 9 is a flowchart illustrating another method 900 for providing shared-order functionality to users of an electronic marketplace utilizing the community pantry engine 102 of FIG. 1, in accordance with at least one further embodiment. The method may begin at block 902, where a first order request for a first portion of an item may be received (e.g., from a first user, by the order processing engine 320 of FIG. 3). The item may comprise a first portion and a second portion and may be offered on an electronic marketplace.

At block 904, a second user may be identified (e.g., by the user identification engine 322 of FIG. 3) based at least in part on a first geographic location of the first user (e.g., a shipping address of the first user) and a second geographic location of the second user (e.g., a shipping address of a second user).

At block 906, a notification related to the first order request may be provided to the second user (e.g., by the notification manager 324 of FIG. 3).

At block 908, a second order request for the second portion of the item may be received from the second user (e.g., by the order processing engine 320).

At block 910, fees may be calculated for the first order request and the second order request. For example, discounted delivery costs may constitute a lesser amount than delivery costs associated with the same order from a single user.

At block 912, the first portion of the item may be provided (e.g., by the delivery workflow manager 326 of FIG. 3) to the first user according to the discounted delivery costs calculated at block 910.

At block 914, the second portion of the item may be provided (e.g., by the delivery workflow manager 326) to the second user according to the discounted delivery costs calculated at block 910.

Figure 10:
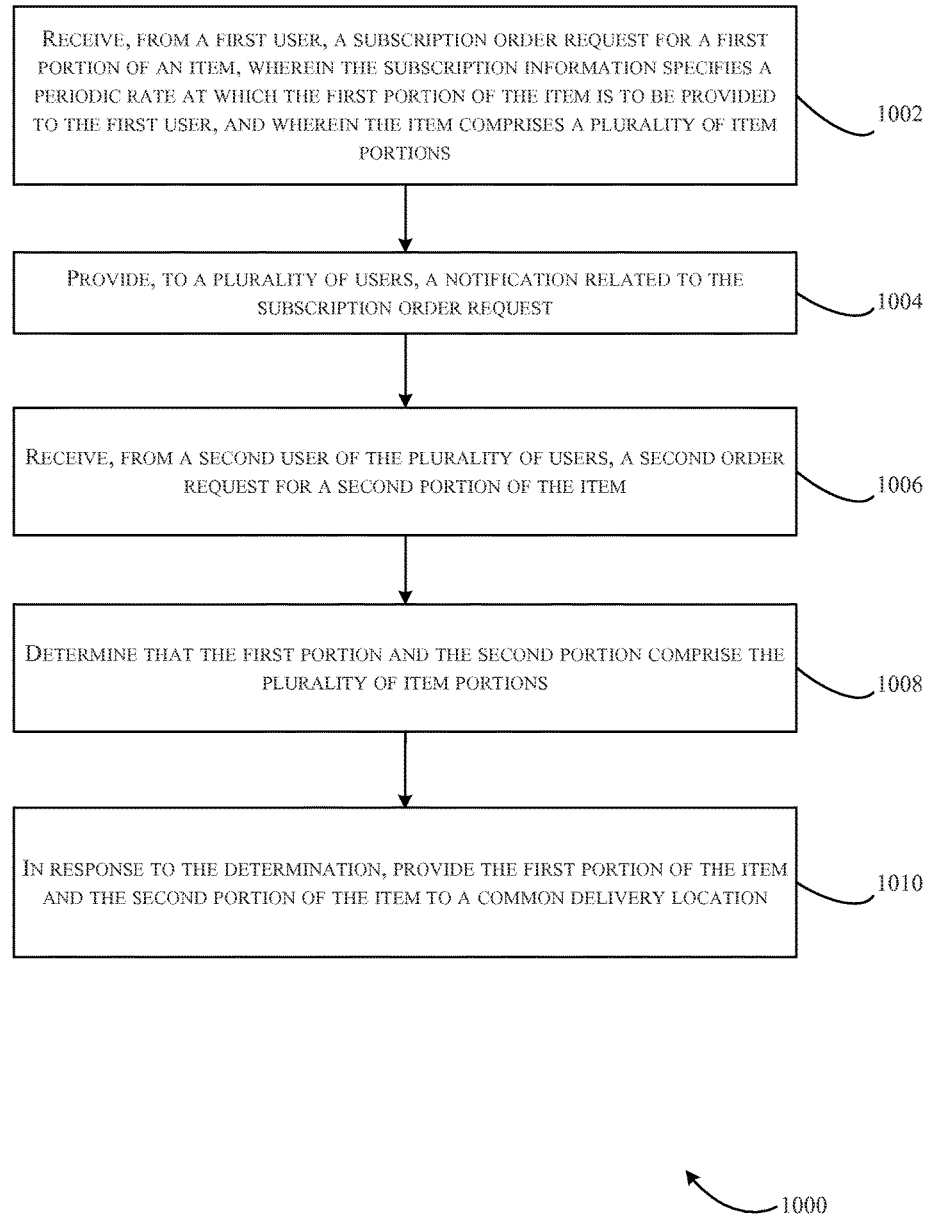
FIG. 10 is a flowchart illustrating still one further method for providing shared-order functionality to users of an electronic marketplace utilizing the community pantry engine, in accordance with at least one further embodiment.

FIG. 10 is a flowchart illustrating still one further method 1000 for providing shared-order functionality to users of an electronic marketplace utilizing the community pantry engine 102, in accordance with at least one further embodiment. The method may begin at block 1002, where a subscription order request for a first portion of an item is received. In at least one example, the subscription information specifies a periodic rate at which the first portion of the item is to be provided to the first user. The item, in this example, may comprise a plurality of item portions.

At block 1004, a notification related to the subscription order request may be provided to a plurality of users (e.g., by notification manager 324 of FIG. 3).

At block 1006, a second order request for a second portion of the item may be received from a second user of the plurality of users (e.g., by the order processing engine 320 of FIG. 3).

At block 1008, the community pantry engine 102 (e.g., the order processing engine 320) may determine that the first portion and the second portion comprise the plurality of the item portions.

At block 1010, the first portion of the item and the second portion of the item may be provided (e.g., by the delivery workflow manager 326 of FIG. 3) to a shared delivery location, in response to the determination made at block 1008.

Figure 11:
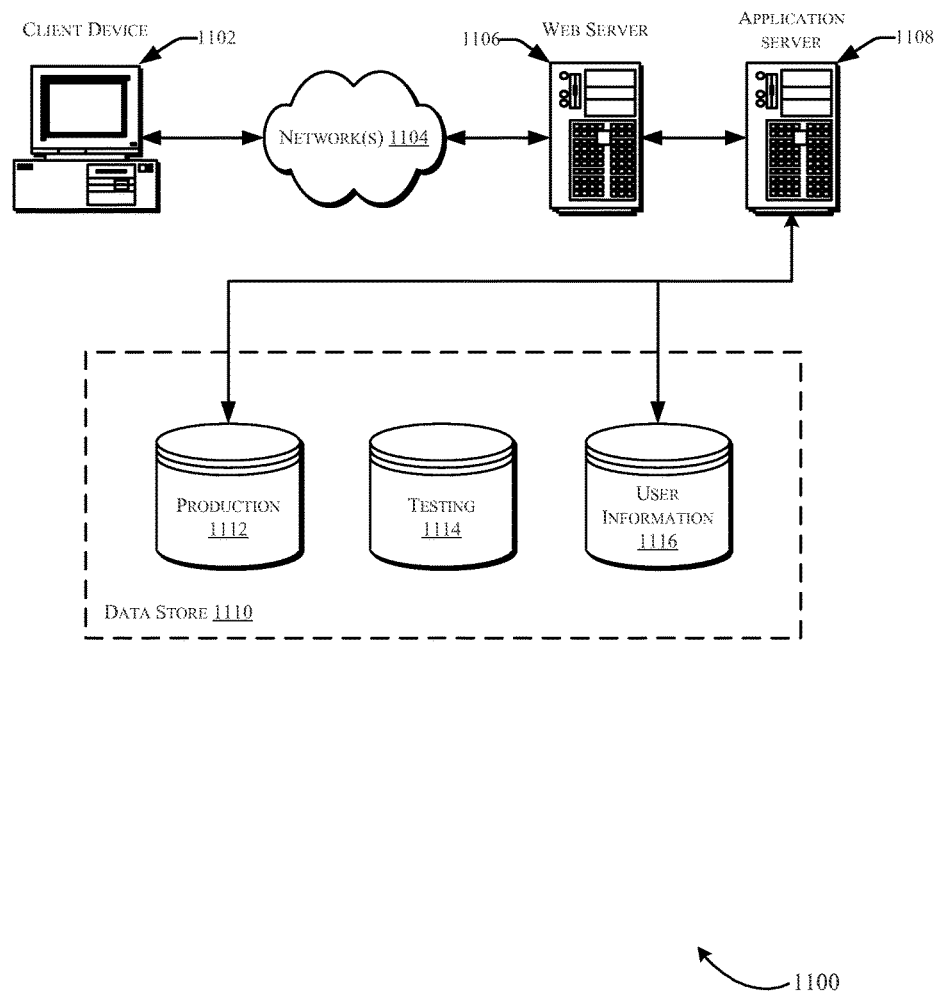
FIG. 11 is a schematic diagram illustrating an example environment for implementing aspects in accordance with at least one embodiment described herein.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes a user device 1102 (e.g., an electronic client device), which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks, an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 1102 and the at least one application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated above includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above-listed mechanisms as appropriate or in additional mechanisms in the data store 1110. The data store 1110 is operable, through logic associated therewith, to receive instructions from the at least one application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the environment 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by one or more data processors, an identification of an association of a group of users of an electronic marketplace;
   receiving, from a first user of the group of users, a subscription order request for a first portion of a bulk item, wherein the bulk item is offered on the electronic marketplace, and wherein the bulk item comprises the first portion, a second portion, and a third portion;
   providing, to a second user of the group of users, a notification related to the subscription order request;
   receiving, from the second user, a second order request for the second portion of the bulk item;
   identifying, by the one or more processors, a third user separate from the group of users based at least in part on a distance between a first geographic location associated with the first user and a second geographic location associated with the third user;
   informing the third user of the subscription order request;
   receiving, from the third user, a third order request for the third portion of the bulk item;
   in response to receiving the second order request and the third order request, delivering the first portion of the bulk item to a first delivery location associated with the first user, wherein the first portion of the bulk item is delivered to the first delivery location using a delivery vehicle;
   in response to receiving the second order request, delivering the second portion of the bulk item to a second delivery location associated with the second user, wherein the second portion of the bulk item is delivered to the second delivery location with the delivery vehicle; and
   in response to receiving the third order request, delivering the third portion of the bulk item to a third delivery location associated with the third user, wherein the third portion of the bulk item is delivered to the third delivery location with the delivery vehicle.

2. The computer-implemented method of claim 1, further comprising:
   determining a respective purchase price for each of the first portion, the second portion, and the third portion based at least in part on respective quantities of the first portion, the second portion, and the third portion; and
   determining a respective delivery price for each of the first portion, the second portion, and the third portion item, wherein the first portion, the second portion, and the third portion are provided based at least in part on the respective purchase price and the respective delivery price.

3. The computer-implemented method of claim 1, further comprising:
   receiving, from the third user, an association request related to the group of users.

4. The computer-implemented method of claim 1, wherein the subscription order request comprises subscription information identifying a periodic rate at which the first portion of the bulk item is to be provided to the first user.

5. A system, comprising:
   a processor; and
   a memory storing computer-executable instructions that, when executed with the processor, cause the system to at least:

receive, from a first user, a first order request related to a bulk item, and wherein the bulk item comprises a first portion of the bulk item and a second portion of the bulk item;

identify a second user based at least in part on a distance between a first geographic location associated with the first user and a second geographic location associated with the second user;

provide, to the second user, a notification related to the first order request;

receive, from the second user, a second order request for the second portion of the bulk item;

calculate fees associated with the first order request and the second order request;

provide the first portion of the bulk item to the first user according to a first portion of the calculated fees; and provide the second portion of the bulk item to the second user according to a second portion of the calculated fees.

6. The system of claim 5, wherein the memory includes further instructions that, when executed with the processor, cause the system to at least:

provide, to the first user, a notification related to the second order request; and receive, from the first user, an indication of acceptance related to the second order request, wherein the first portion of the bulk item and the second portion of the bulk item are provided in response to receiving the indication of acceptance.

7. The system of claim 5, wherein the memory includes further instructions that, when executed with the processor, cause the system to at least:

execute a first shipping workflow to ship the first portion of the bulk item to the first user at a first shipping address; and execute a second shipping workflow to ship the second portion of the bulk item to the second user using a second shipping address.

8. The system of claim 5, wherein the memory includes further instructions that, when executed with the processor, cause the system to at least:

determine a shared delivery location for the first portion of the bulk item and the second portion of the bulk item, wherein providing the first portion of the bulk item to the first user and providing the second portion of the bulk item to the second user utilizes the shared delivery location, and wherein the shared delivery location corresponds to an address of at least one of the first user and the second user.

9. The system of claim 8, wherein the memory includes further instructions that, when executed with the processor, cause the system to at least:

determine that the first portion and the second portion comprise the bulk item as a whole, wherein the first portion of the bulk item is provided to the first user based at least in part on a determination that the first portion and the second portion comprise the bulk item as the whole.

10. The system of claim 5, wherein the distance between the first geographic location and the second geographic is within a threshold distance apart.

11. The system of claim 5, wherein the memory includes further instructions that, when executed with the processor, cause the system to at least:

receive user preference information from the second user, wherein the user preference information indicates an interest of the second user in notifications related to the bulk item.

12. The system of claim 5, wherein the memory includes further instructions that, when executed with the processor, cause the system to at least:

generate a packaging specification for the first portion of the bulk item based at least in part on a size or a quantity of the first portion of the bulk item, wherein the packaging specifications include at least one of a warning label or a nutritional details label.

13. A computer-implemented method, comprising:

receiving, by one or more processors from a first user, a subscription order request for a first portion of a bulk item, wherein subscription information associated with the subscription order request specifies a periodic rate at which the first portion of the bulk item is to be provided to the first user, and wherein the bulk item comprises a plurality of bulk item portions;

identifying, by the one or more processors, a plurality of users based at least in part on respective distances between a first geographical location of the first user and corresponding geographical locations of each of the plurality of users;

providing, to the plurality of users, a notification related to the subscription order request;

receiving, from a second user of the plurality of users, a second order request for a second portion of the bulk item;

determining that the first portion and the second portion comprise the plurality of bulk item portions; and in response to the determination, providing the first portion of the bulk item and the second portion of the bulk item to a shared delivery location.

14. The computer-implemented method of claim 13, wherein the second order request includes subscription information that specifies another period rate at which the second portion of the bulk item is to be provided to the second user.

15. The computer-implemented method of claim 13, further comprising:

allocating corresponding portions of a shared delivery fee to the first user and the second user.

16. The computer-implemented method of claim 13, further comprising:

determining a threshold number of purchasing users needed to provide the bulk item to a plurality of delivery locations;

determining that the first user and the second user do not exceed the threshold number of purchasing users needed to provide the bulk item to the plurality of delivery locations; and determining a shared delivery location for the first portion of the bulk item and the second portion of the bulk item, wherein providing the first portion of the bulk item to the first user and providing the second portion of the bulk item to the second user utilizes the shared delivery location.

17. The computer-implemented method of claim 16, wherein the shared delivery location comprises a shipping locker, and wherein the shipping locker includes a locking mechanism and a weight scale.

18. The computer-implemented method of claim 13, further comprising:

identifying the plurality of users based at least in part on at least one of a historical purchase history of the plurality of users, a shipping address of the first user, corresponding shipping addresses of the plurality of users, or user preference information associated with the plurality of users.

19. The computer-implemented method of claim 18, wherein the user preference information indicates interest of the plurality of users in the bulk item.

20. The computer-implemented method of claim 13, further comprising:
- determining a threshold number of purchasing users needed to complete an order for the bulk item, wherein providing the first portion of the bulk item to the first user and providing the second portion of the bulk item to the second user are further based at least in part on determining that the first user and the second user exceed the threshold number of purchasing users needed to complete the order.

* * * * *